Dec. 5, 1961  R. McFARLAND, JR  3,011,758
VALVE DIAPHRAGMS
Filed May 1, 1958  6 Sheets-Sheet 1

INVENTOR.
ROLLAND McFARLAND Jr.
BY Edward H Lang
ATTORNEY.

Dec. 5, 1961  R. McFARLAND, JR  3,011,758
VALVE DIAPHRAGMS

Filed May 1, 1958  6 Sheets-Sheet 2

INVENTOR.
ROLLAND McFARLAND Jr.
BY
Edward H. Lang
ATTORNEY.

Dec. 5, 1961 R. McFARLAND, JR 3,011,758
VALVE DIAPHRAGMS
Filed May 1, 1958 6 Sheets-Sheet 3

INVENTOR.
ROLLAND McFARLAND Jr.
BY
Edward H. Lang
ATTORNEY.

INVENTOR.
ROLLAND McFARLAND JR.
BY
ATTORNEY.

INVENTOR.
ROLLAND McFARLAND JR.
BY
ATTORNEY.

FIG. 13

INVENTOR.
ROLLAND McFARLAND JR.
BY
ATTORNEY.

United States Patent Office 3,011,758
Patented Dec. 5, 1961

3,011,758
VALVE DIAPHRAGMS
Rolland McFarland, Jr., Crystal Lake, Ill., assignor to Hills-McCanna Company, Chicago, Ill., a corporation of Illinois
Filed May 1, 1958, Ser. No. 733,789
12 Claims. (Cl. 251—331)

This invention relates to diaphragm valves, and to diaphragms therefor. The invention is more particularly concerned with a new type of solid and homogeneous plastic diaphragm of modified design, to permit use of only moderately flexible plastic material. The invention is directed to diaphragms for use in weir type valves of the Saunders type, as exemplified by Patents Nos. 1,855,-991; 2,054,340; and 2,302,930; in which the diaphragm is adapted to be depressed against a raised weir, across the fluid passageway through the valve, in order to obtain closure. This application is a continuation-in-part of applications, Serial No. 57,013, filed October 28, 1948, and Serial No. 315,493, filed October 18, 1952, both now abandoned.

At the present time, diaphragms for these valves are made of rubber or synthetic elastomers such as neoprene, Hycar, etc., with these materials being compounded into diaphragm form to take maximum advantage of their properties of elastic deformation, recovery, resistance to absorption, and/or chemical resistance.

However, these materials have only moderate and very specific chemical resistance, and their use in such fields are limited. On the other hand, there are known plastic materials, such as the polymeric ethylene, chloropolyethylene, polytetrafluorethylene (Teflon), polymonochlorotrifluoroethylene (KEL-F) and polyamides (nylon), which have exceptional chemical resistance, but are limited in greater or less degree in their physical properties such as tensile strength, elongation, elastic deformation, and recovery. However, their resistance to absorption and/or chemical resistance is exceedingly high.

An object of this invention is to provide an improved diaphragm for use in connection with diaphragm type valves.

Another object of the invention is to provide a valve diaphragm construction which will permit use of relatively stiff, inflexible materials.

Still another object of the invention is to provide a diaphragm valve capable of being used in services for which natural and synthetic rubber diaphragms and other flexible type diaphragms are unsuitable because of excessive chemical corrosion and/or high temperature.

A further object of this invention is then to provide a diaphragm design which will enable the use of these chemically resistant plastics within the practical limits permitted by the restricted physical properties of the plastic material.

Another object of this invention is to provide an improved diaphragm for use in connection with the above-mentioned diaphragm type valve.

Further objects of the invention will become apparent from the following description and accompanying drawing of which.

Figure 10:
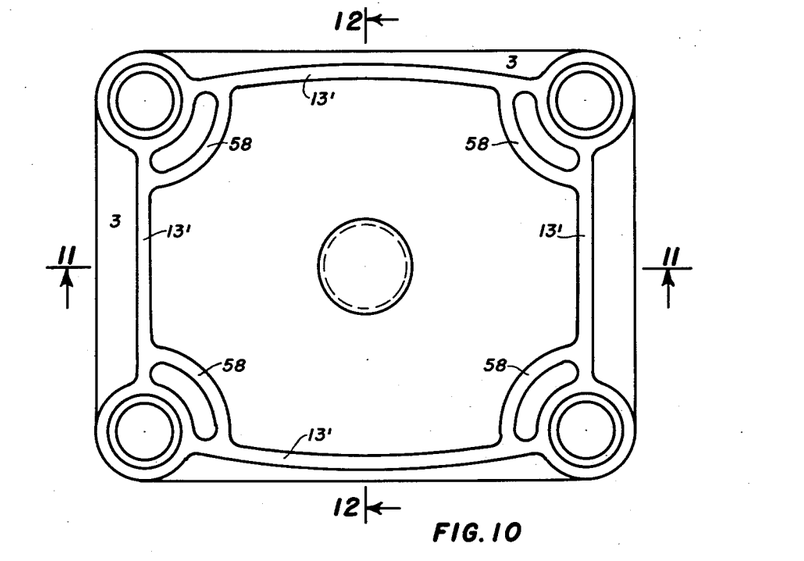
FIGURE 10 is a plan view looking at the upper face of another modification of the improved diaphragm.

Referring to the drawing, the diaphragm is indicated generally by the numeral 1. The diaphragm illustrated in FIGURES 1 to 6 has a circular periphery, but may be shaped to fit a particular valve. For example, the periphery may be rectangular with rounded corners as shown in FIGURES 7 and 10.

Figure 1:
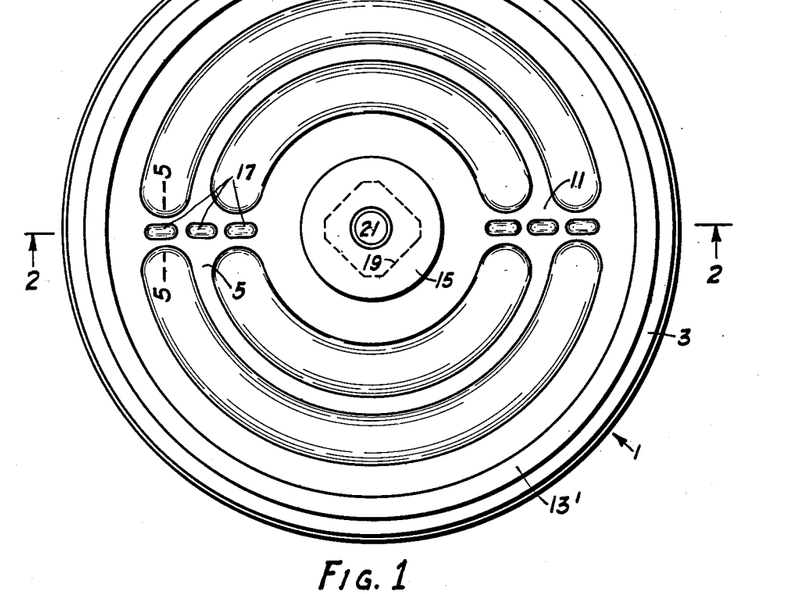
FIGURE 1 is a plan view looking at the upper face of my improved diaphragm.
Figure 2:
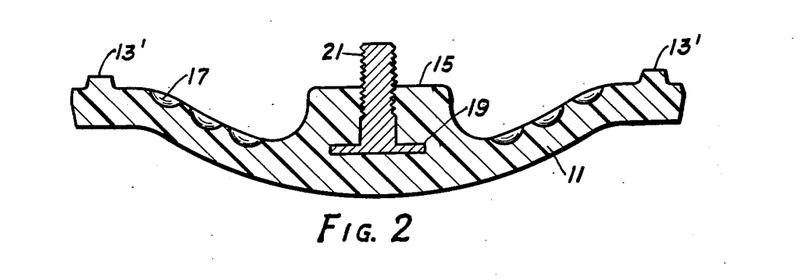
FIGURE 2 is a cross-section of the diaphragm taken along the line 2—2 of FIGURE 1.
Figure 3:
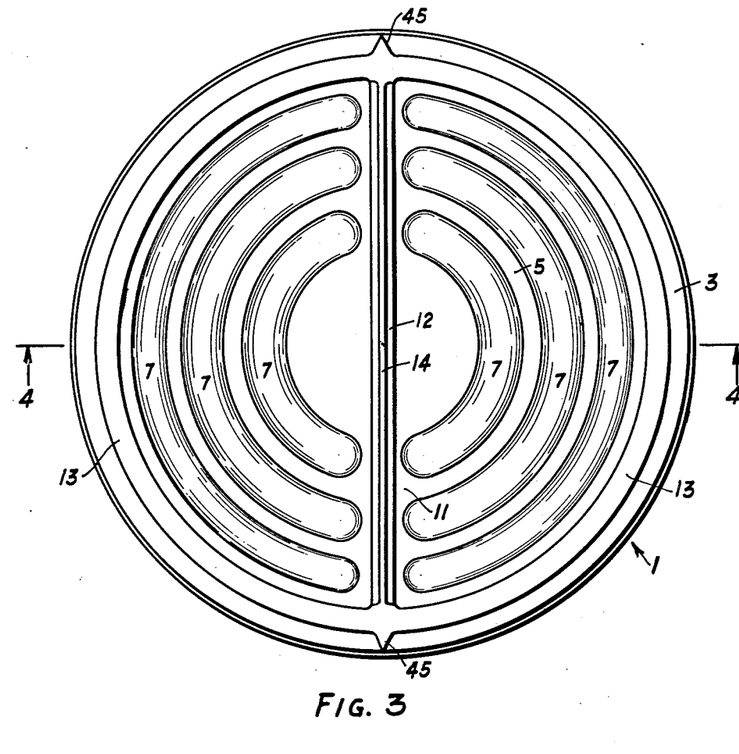
FIGURE 3 is a plan view looking at the bottom face of the diaphragm.

Referring to FIGURES 1 to 6, the diaphragm is formed with a substantially flat thick edge portion 3 and a thin central bowl section 5. The surface of the bowl section is corrugated or undulated to form a series of alternate concentric crests 7 and hollows 9. The arc-shaped crests and hollows merge into a strip 11 (shown in FIGURE 5) running through the middle of the diaphragm in the same direction as the weir of the valve in connection with which the diaphragm is to be used. A rib 12 on the underside of strip 11 blends into a circular bead 13 on the under surface of the edge portion 3. Rib 12 is not as deep as rib 13. A circular bead 13', corresponding to bead 13, is formed on the upper side of edge portion 3, directly above bead 13. A narrow bead 14 is formed along the middle of rib 12 and merges into circular bead 13 so as to form a smooth surface at the points of jointure as shown in FIGURE 2.

Figure 5:
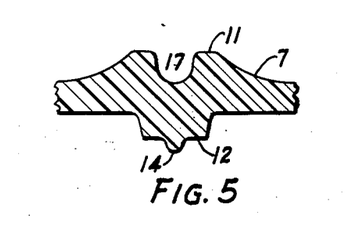
FIGURE 5 is an enlarged fragmentary cross-sectional view of the diaphragm taken along the line 5—5 of FIGURE 1.

As shown in the drawing, the crests and hollows forming the undulations on one side of the center strip 11 match those on the other side of the strip being arcs of the same circle. It will be understood, however, that the crests and hollows may be arcs of circles having radii greater than those having their centers at the middle of the diaphragm.

As shown in the drawing, the undulated area of the diaphragm contains a series of five alternate crests and hollows. It will be understood that the number of undulations may be greater or less, depending on the size of the diaphragm. In general, however, substantially the entire bowl-shaped area of the diaphragm between the nubbin 15 and the edge portion 3 will be formed into an undulated surface with preferably three crests and two hollows to approximately one linear inch. By forming the bowl-shaped portion of the diaphragm with a corrugated or undulated surface, the diaphragm will act somewhat like a bellows upon being compressed or allowed to expand.

The cross-section of the diaphragm graduates from a thick nubbin 15 to a relatively thin bellows or undulated section 5 and again thickens in the edge portion 3. The thickness of the diaphragm in the bellows or undulated portion may be between 1/32" and 1/8", depending on the size of the valve to which it is to be applied and the pressures to which it is to be subjected in service. With materials which are relatively inflexible and inelastic as compared with rubber, such as polythene and Teflon, the bellows sections should be made as thin as possible, consistent with the service to which it is to be subjected. By forming the diaphragm with a thin bowl-shaped bellows section, it is possible to deform the diaphragm to assume any position ordinarily assumed during the opening and closing of the valve without physically injuring the diaphragm.

The diaphragm is preferably molded in closed position. In molding the diaphragm, the corrugated area is formed with crests on both sides of strip 11 immediately adjacent flat edge portion 3 and nubbin 15. The diaphragm reaches its minimum thinness at the middle crests, since maximum distortion of the diaphragm occurs at this point and, therefore, it is necessary to provide maximum flexibility at this point.

The diaphragm is molded with crests on either side of strip 11 immediately adjacent the nubbin 15 with the cross-sectional thickness of the diaphragm gradually increasing from these crests to the nubbin in order to provide additional strength.

The center strip 11, as more clearly shown in FIGURES 2 and 5, is somewhat thicker than the bellows section and may be of approximately the same thickness as the edge portion 3, namely about 1/8 to 5/32 inch. The strip 11 is the portion of the diaphragm which is depressed against the weir of the valve to close it. This section must necessarily be stronger than the bellows section in order to withstand the additional wear, but at the same time must have sufficient flexibility to permit the diaphragm to be distorted into its various positions without cracking or breaking. The required flexibility is imparted to the strip 11 by forming the upper surface of the bowl portion of the diaphragm with a series of closely spaced elongated recesses 17 directly above rib 12. The recesses 17 are relatively long and narrow and of a depth at the nadirs thereof about equal to the combined thickness or depth of rib 12 and bead 14.

The nubbin 15 at the center of the diaphragm is sufficiently thick to enable the head 19 of a threaded metallic stud 21 to be molded into the nubbin and held fast therein. The head 19 is preferably rectangular in outline in order to prevent it from turning in the nubbin. It should be understood that means other than a threaded stud may be used to enable the diaphragm to be attached to the compressor plate 23 (FIGURE 6) of the valve 25, as, for example, by means of a shear ring, T-headed bolt or by means of a pin. In the event it is not desired to fasten the diaphragm to the compressor plate or in the event a means of attachment to the compressor plate is used which does not require a thickened nubbin, the center portion of the diaphragm may be made without the thickened nubbin, and will approximately correspond in thickness to the edge portion 3 of the diaphragm.

The particular diaphragm illustrated in the drawings is designed to be used with a valve in which the bolts holding the body and bonnet together do not pass through the diaphragm. However, if the diaphragm is to be used in connection with a valve of the type in which bolts pass through the diaphragm, the diaphragm will be formed with spaced holes adjacent the periphery, through which bolts are adapted to pass when assembling the valve. Each hole would be surrounded by a bead similar to that disclosed in U.S. Patent No. 2,302,930.

Figure 6:
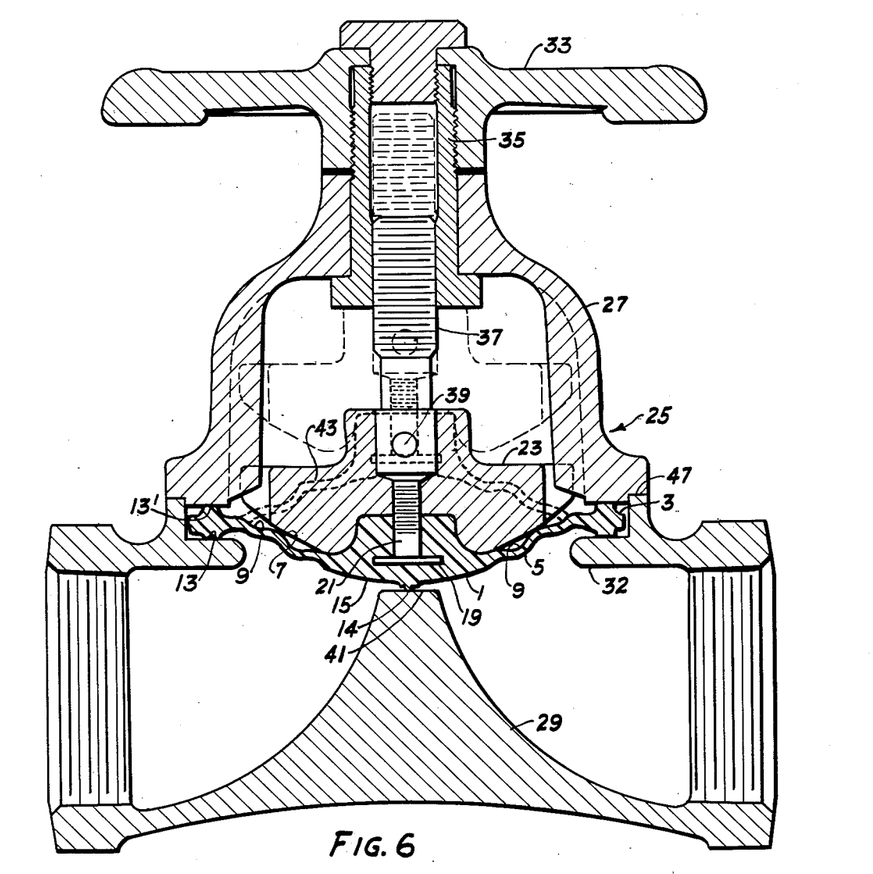
FIGURE 6 is a vertical cross-sectional view of a valve equipped with the novel diaphragm.
Figure 7:
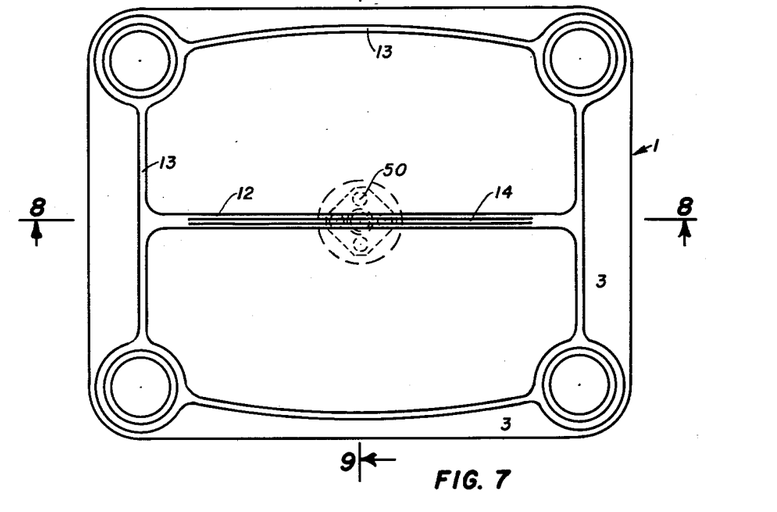
FIGURE 7 is a plan view, looking at the lower face of another modification of the improved diaphragm.

A typical valve 25 is shown diagrammatically in FIGURE 6, consisting of the bonnet 27 and body 29 between which the diaphragm 1 is clamped by suitable posts or bolts not shown. The annular ribs or beads 13 and 13' are compressed between the lower surface of the bonnet 27 and the inwardly extending annular flange 32 on the body 29. Thus, only a relatively narrow portion of the diaphragm is held rigidly as a result of which the diaphragm in effect has a floating action which gives flexibility to the diaphragm and cuts down the strain on the diaphragm as it passes from closed to open position. The compressor plate 23 is fastened at its center to the diaphragm by screwing the stud 21 into a threaded recess extending upwardly through the compressor plate in the manner shown and described in U.S. Patent No. 1,855,991. The compressor plate may be of the finger type or solid plate type. The valve contains the usual hand wheel 33 fastened to a depending internally threaded cylinder or sleeve 35 into which a stem 37 is screwed. The lower end of stem 37 is fastened in any suitable manner, as, for example, by means of a pin 39 in the manner shown in U.S. Patent No. 2,054,340, to the compressor plate.

Figure 4:
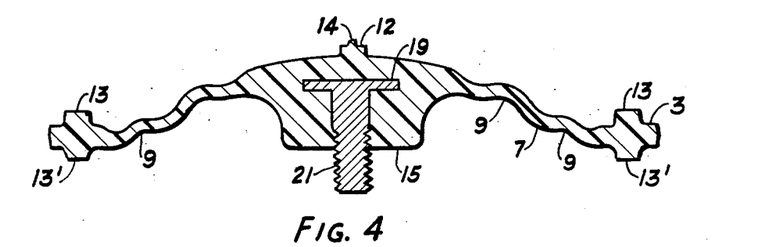
FIGURE 4 is a cross-section of the diaphragm taken along the line 4—4 of FIGURE 3.

In operation of a valve equipped with my novel diaphragm, the diaphragm will have the contour shown in FIGURES 2, 4 and 6 when the valve is in fully closed position. Because bead 14 is narrow, it can be distorted sufficiently when placed under pressure to fit snugly at all points against the face of weir 41, thereby preventing leakage through the valve when it is in closed position.

The diaphragm, compressor plate and stem in fully open position are shown in dotted lines in FIGURE 6. As the diaphram passes through its neutral axis, the undulations gradually fold together, the lateral movement of the undulating section reaching maximum folding when the stud head 19 lies approximately in the neutral axis of the diaphragm. As the diaphragm continues toward the fully opened position, the undulations unfold until the diaphragm assumes the shape shown in dotted line 43. It will be evident that in order to close the valve against leakage, the portion of the diaphragm that is compressed agaist the weir 41 must be substantially smooth and free from folds or undulations.

Markers or indicators 45 are molded at opposite points on the periphery of the diaphragm. Appropriate marks or lines are placed on face 47 of the valve body. By lining up markers 45 with the lines on the valve body, the diaphragm will be placed in the correct position in the valve so that bead 14 is in line with weir 41.

Figure 8:
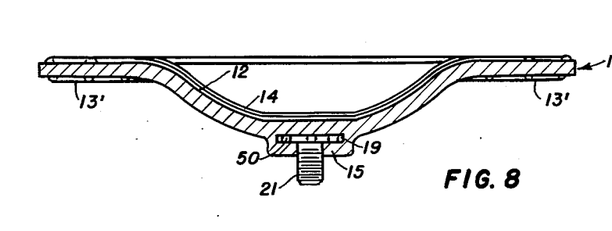
FIGURE 8 is a cross-sectional view of the diaphragm, taken along the line 8—8 of FIGURE 7.
Figure 9:
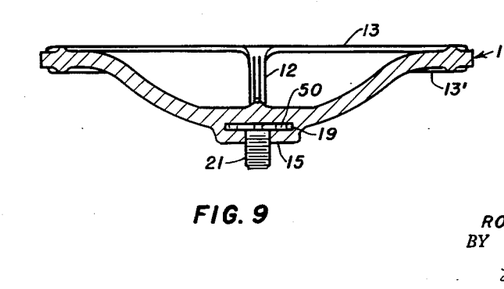
FIGURE 9 is another cross-sectional view of the diaphragm taken along the line 9—9 of FIGURE 7.

Referring now to FIGURES 7 to 9, the modification shown in these figures has a generally rectangular periphery with rounded corners to fit a valve having similarly shaped body and bonnet flanges. This diaphragm is formed or molded over its major area of a thin, smooth layer of plastic without any flutes or undulations. A diaphragm for a two inch valve will have a thickness of about 0.070 inch. The bowl-shaped portion of the diaphragm is formed at its center with a heavy nubbin section 15 in which the stud 21 is molded. The head of the stud is formed with holes 50 in order to permit the plastic material to flow therethrough during the molding operation and provide high anchorage strength of the stud head in the nubbin.

The single bead 13 on the wet side of the diaphragm surrounds the bolt holes 52. The corresponding bead 13' on the dry face of the diaphragm matches bead 13. The wet side of the diaphragm is formed with a central rib 12 and narrow bead 14 as described in connection with FIGURES 1 to 6.

Figure 13:
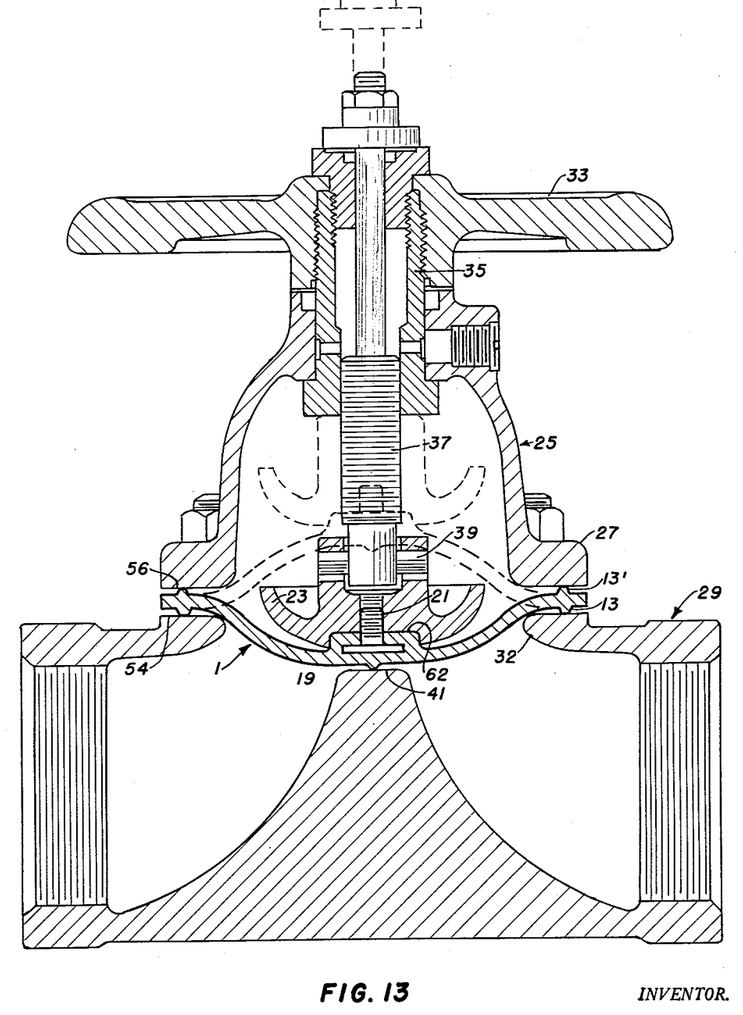
FIGURE 13 is a vertical cross-sectional view of a valve in closed position equipped with the novel diaphragm shown in FIGURES 7 to 9.

When assembled in a valve as shown in FIGURE 13, the diaphragm has a double suspension between the bolting flanges 54 and 56 of the body and bonnet, respectively, through the medium of beads 13 and 13'. The beads 13 and 13' project outwardly from the face of the diaphragm a sufficient distance and are of sufficient width so that when compressed between the bolted flanges they form a fluid tight seal without having the flanges impinge upon the faces proper of the diaphragm. In the two inch valve diaphragm, these beads will extend approximately 0.078 inch outwardly from the face of the diaphragm and be about ⅛ inch wide. In the preferred construction, the beads have tapered sides so that they are wider at the juncture with the face of the diaphragm than at their face.

In the closed position shown in FIGURE 13, the narrow or sacrificial bead 14 has been compressed against weir 41 to form a fluid tight seal. Although the use of the sacrificial bead is desirable on larger sized diaphragms, it may be omitted on diaphragms for smaller valves in which case the rib 12 is sufficiently narrow to permit required distortion to give effective sealing. In the two inch valve diaphragm the tapered rib 12 will be approximately ¼ inch wide across its face and .078 inch deep with a narrow semi-circular bead 14 having a radius of about 0.032 inch. By using the sacrificial bead, it becomes unnecessary to machine the weir seat in order to obtain a leak-proof seal when the valve is closed.

The fact that only a very narrow portion of the diaphragm is held rigidly between the body and bonnet flanges gives to the diaphragm a floating action with the beads 13 and 13' acting as pivots to allow the main body to pass from open to closed position with the minimum amount of distortion and deformation.

Although the compressor plate 23 may be of the fingered or of the smooth continuous surface type, the latter is preferred because it imposes less mechanical abuse on the diaphragm.

Figure 11:
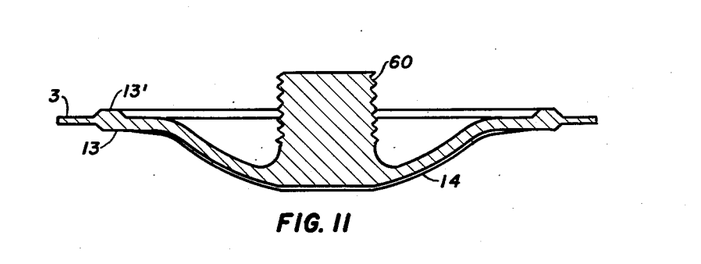
FIGURE 11 is a cross-section of the diaphragm taken along the line 11—11 of FIGURE 10.
Figure 12:
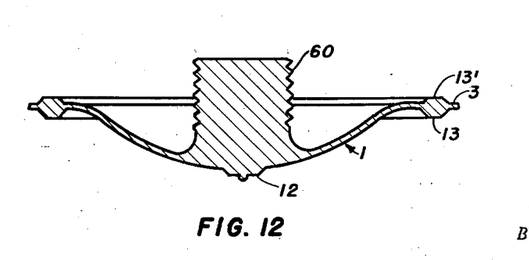
FIGURE 12 is a cross-sectional view of the diaphragm, taken along the line 12—12 of FIGURE 10.

The further modification shown in FIGURES 10 to 12 differs essentially from that shown in FIGURES 7–9 in that it has reinforcing beads 58 bridging across beads 13 and 13' in front of the bolt holes to provide additional protection against leakage through these holes; and instead of molding a metallic stud into the nubbin, the nubbin is elongated and threaded as shown by numeral 60 so that it can be screwed directly into the compressor plate. It will be apparent that the bottom recess 62 in the compressor plate will have to be threaded and made deeper to accommodate the threaded nubbin shown in FIGURES 10 to 12.

The molecular weight of the plastic materials from which the diaphragm is molded may range from about 19,000 to 55,000. Plastics of this molecular weight have limited flexibility and therefore must be carefully designed to give the proper relationship between thickness and maximum radius of flexure. It has been found that to provide a durable diaphragm the thickness should not be more than ¼ of the radius of the bowl portion of the diaphragm in fully open or closed position.

It will be noted from FIGURE 13 that the flexure or arcing of the diaphragm is gradual. There is no fixed line of flexure or bending as would be the case if the whole edge portion of the diaphragm were clamped between the opposing flanges. This gradual flexure prevents localized and concentrated stresses which would rapidly develop cracks in the diaphragm. Because of the bead suspension, the stresses are distributed over the entire flexing area and dissipate into the central area of the diaphragm and the line of clampage adjacent the edge of the diaphragm.

Because of the lack of adhesion between the plastic and metal, it is expedient when using a metallic stud to use a square headed stud with holes through which the plastic can be forced to firmly anchor the stud. A sufficient mass of plastic is molded above the stud head to withstand the tensile force to which it is subjected in opening the valve. The thickness of plastic above the stud head is approximately equal to that below the head. In the two inch valve this thickness is about ¼ inch.

The diaphragm may be molded in either open or closed position but it is preferred to mold it in closed position since by so doing, a better closure fit is obtained without the necessity of imposing undue pressure on the diaphragm.

The floating action of the diaphragm results from the diaphragm material along the longitudinal axis of the beads being placed in compression sufficient for sealing against the bonnet and body flanges but without confining it in the critical area of flexure where the material must flex to a maximum extent during opening and closing of the diaphragm. The bead support for the diaphragm may be likened to a simple beam action with the diaphragm suspended from a double fulcrum provided at the point of engagement of one bead with the body flange and at the point of engagement of the other bead with the bonnet flange and it is between these fulcrum surfaces that the bead is securely clamped in sealing relationship therewith. The polymeric plastic material of the diaphragm can distort within itself and thus internally twist or cant along the longitudinal axis of the beads but with the surfaces of the beads remaining in fixed sealing contact with the body and bonnet flanges. With this construction, the relatively inflexible polymeric plastic material of the diaphragm would normally, under repeated flexure, tend to deteriorate to the failure point either from fatigue or by exceeding the tensile strength thereof, but with the bead structure to provide the floating action, such materials lend themselves admirably to a valve structure of this type where resistance to corrosion is important and where repeated opening and closing is necessary but the flexing results primarily from the mounting arrangement so that the internal relative displacement movement of the plastic material does not reach a point where failure would occur and sufficiency of cross-section of the material for this purpose is provided by the bead structure and the laterally extending parts of the diaphragm peripheral portion.

My novel diaphragm is useful in conjunction with known weir-type diaphragm valves, such as the Hills-McCanna Saunders valves.

It will be seen, therefore, that by the unique construction of the diaphragm, I am able to mold diaphragms from relatively inflexible, chemically inert and heat resistant plastics which diaphragms will have the necessary flexibility to operate satisfactorily in weir-type diaphragm valves.

What is claimed is:

1. A valve comprising a body having a valve seat, a bonnet and a diaphragm, the peripheral portion of which is substantially flat and lies between opposite faces of said body and bonnet, said diaphragm being composed of chemically resistant, organic synthetic polymeric plastics material having sufficient flexibility to function as a diaphragm but the stiffness and inflexibility of which is sufficiently greater than that of elastomeric rubber so that diaphragms made of such plastics material rapidly develop cracks upon repeated flexure and wherein the plastics material is selected from the group consisting of polymeric ethylene, chloropolyethylene, polytetrafluorethylene, polymonochlorotrifluoroethylene and nylon, said diaphragm having a continuous bead molded of the same plastics material on each face of said peripheral portion, directly opposite each other and spaced from the outer edge of the diaphragm, said beads being substantially narrower than said flat peripheral edge portion and said opposite body and bonnet faces, and extending outwardly from the respective faces of the diaphragm a distance such that said body and bonnet are clamped together against said beads in leak-proof relationship with the remaining peripheral portion of the diaphragm being substantially free of the opposite faces of said body and bonnet, thereby greatly increasing the number of times the diaphragm can be flexed from open to closed positions without physical injury thereto.

2. A chemically resistant valve diaphragm molded of synthetic organic polymeric plastics material having sufficient flexibility to function as a valve diaphragm but having sufficiently greater stiffness and inflexibility than elastomeric rubber so that diaphragms made of such plastics material rapidly develop cracks upon repeated flexure and wherein the plastics material is selected from the group consisting of polymeric ethylene, chloropolyethylene, polytetrafluorethylene, polymonochlorotrifluoroethylene and nylon, said diaphragm having a central bowl portion and a substantially flat peripheral portion with a single continuous bead molded of the same plastics material on each face of said peripheral portion directly opposite each other and intermediate the inner and outer boundaries of said peripheral portion, said beads being narrow with respect to said flat peripheral portion and extending outwardly from the respective faces of said peripheral portion a sufficient distance to furnish a leak-proof seal, when clamped in an assembled valve, without clamping the faces of said peripheral portion.

3. A chemically resistant valve diaphragm as claimed in claim 2, wherein the bowl portion of the diaphragm includes a series of recesses to increase the flexibility thereof.

4. A chemically resistant valve diaphragm as claimed in claim 2, wherein the bowl portion is undulated to increase the flexibility thereof.

5. A valve comprising a body having a valve seat, a bonnet and a diaphragm having a radially extending peripheral portion and a central portion cooperable with the valve seat to control the passage of fluid, said body and said bonnet having opposed clamping surfaces between which the peripheral portion of the diaphragm is disposed, said diaphragm being composed of chemically resistant material of limited inherent flexibility having a tendency toward relatively rapid failure upon repeated flexure thereof and selected from the group consisting of polymeric ethylene, chloropolyethylene, polytetrafluorethylene, polymonochlorotrifluoroethylene and nylon having a continuous integral bead on each face of the peripheral portion thereof and spaced intermediate the inner and outer extremity thereof and in substantially direct opposition to one another, said beads being substantially narrower than the clamping surfaces of the body and bonnet, and positioned radially intermediate the said clamping surfaces and with the peripheral portion of the diaphragm substantially traversing the remaining radial extent of the said clamping surfaces and remaining substantially free thereof, the beads extending outwardly from the peripheral portion of the diaphragm a distance such that when clamped between the clamping surfaces of the body and bonnet the inner peripheral portion of the diaphragm will flex between open and closed positions without substantial interference from the adjacent edges of the bonnet and body, and the remaining outer peripheral portion of the diaphragm outwardly of said beads being movable in complement to movement of the inner peripheral portion of the diaphragm and providing sufficient material across the bead area for the material therein to be internally displaced without abrupt flexure and within the tensile limits thereof.

6. In a valve having a bonnet and a body provided with a valve seat and wherein the body and bonnet have opposed clamping surfaces, the combination with said clamping surfaces of a diaphragm having a radially extending peripheral portion disposed between said clamping surfaces and a central portion cooperable with the valve seat to control the passage of fluid, said diaphragm being composed of chemically resistant material of limited inherent flexibility having a tendency toward relatively rapid failure upon repeated flexure thereof and having a rib along the wet face of the diaphragm and a continuous integral bead on each face of the peripheral portion thereof and spaced intermediate the inner and outer extremity thereof and in substantially direct opposition to one another, said beads being substantially narrower than the clamping surfaces of the body and bonnet, and positioned radially intermediate the said clamping surfaces and with the peripheral portion of the diaphragm substantially traversing the remaining radial extent of the said clamping surfaces and remaining substantially free thereof, the beads being sufficiently resistant to compression to maintain their integrity and seal the valve under clamping pressure between the contacted portions of the clamping surfaces of the body and bonnet and spacing said clamping surfaces away from the adjacent inner and outer peripheral portions of the diaphragm and said beads extending outwardly from the peripheral portion of the diaphragm a distance such that when clamped between the clamping surfaces of the body and bonnet the inner peripheral portion of the diaphragm will flex between open and closed positions without substantial interference from the adjacent edges of the bonnet and body, and the remaining outer peripheral portion of the diaphragm outwardly of said beads being movable in complement to movement of the inner peripheral portion of the diaphragm and providing sufficient material across the bead area for the material therein to be internally displaced without abrupt flexure and within the tensile limits thereof.

7. A valve comprising a body having a valve seat, a bonnet and a diaphragm having a radially extending peripheral portion and a central portion cooperable with the valve seat to control the passage of fluid, said body and said bonnet having opposed clamping surfaces between which the peripheral portion of the diaphragm is disposed, said diaphragm being composed of chemically resistant material of limited inherent flexibility having a tendency toward relatively rapid failure upon repeated flexure thereof and having central nubbin means and a continuous integral bead on each face of the peripheral portion thereof and spaced intermediate the inner and outer extremity thereof and in substantially direct opposition to one another, said beads being substantially narrower than the clamping surfaces of the body and bonnet, and positioned radially intermediate the said clamping surfaces and with the peripheral portion of the diaphragm substantially traversing the remaining radial extent of the said clamping surfaces and remaining substantially free thereof, the beads being sufficiently resistant to compression to maintain their integrity and seal the valve under clamping pressure between the contacted portions of the clamping surfaces of the body and bonnet and spacing said clamping surfaces away from the adjacent inner and outer peripheral portions of the diaphragm and said beads extending outwardly from the peripheral portion of the diaphragm a distance such that when clamped between the clamping surfaces of the body and bonnet the inner peripheral portion of the diaphragm will flex between open and closed positions without substantial interference from the adjacent edges of the bonnet and body, and the remaining outer peripheral portion of the diaphragm outwardly of said beads being movable in complement to movement of the inner peripheral portion of the diaphragm and providing sufficient material across the bead area for the material therein to be internally displaced without abrupt flexure and within the tensile limits thereof.

8. A valve as claimed in claim 7, wherein the nubbin means includes an attachment element molded therein.

9. A valve as claimed in claim 7, wherein the diaphragm includes a plurality of spaced bolt holes adjacent the periphery thereof with each bolt hole surrounded by a narrow bead on both faces of the diaphragm.

10. A valve as claimed in claim 9, wherein additional segmental reinforcing beads are disposed inwardly of each of the beads surrounding each bolt hole.

11. A valve as claimed in claim 7, wherein a surface of the diaphragm includes a series of recesses to increase the flexibility thereof.

12. A valve as claimed in claim 7, wherein the central portion of the diaphragm is undulated to increase the flexibility thereof.

References Cited in the file of this patent

UNITED STATES PATENTS

| | | |
|---|---|---|
| 367,618 | Haggerty | Aug. 2, 1887 |
| 1,643,500 | Jacobson | Sept. 27, 1927 |
| 1,771,410 | Landis | July 29, 1930 |
| 1,836,976 | Krause | Dec. 15, 1931 |
| 1,984,868 | Deming | Dec. 18, 1934 |
| 2,302,930 | Anderson | Nov. 24, 1942 |
| 2,307,066 | Paulus | Jan. 5, 1943 |
| 2,615,471 | McFarland | Oct. 28, 1952 |
| 2,684,829 | McFarland | July 27, 1954 |

OTHER REFERENCES

"Modern Plastics," November 1947, pp. 108–109, published by Breskin Publications, 575 Madison Ave., N.Y. 22, N.Y. (Copy in Scientific Library.)